(12) United States Patent
Thé et al.

(10) Patent No.: US 9,738,840 B2
(45) Date of Patent: *Aug. 22, 2017

(54) ULTRA-LOW WATER INPUT OIL SANDS RECOVERY PROCESS

(71) Applicant: Lakes Environmental Research Inc., Waterloo (CA)

(72) Inventors: Jesse Thé, Waterloo (CA); Roydon Andrew Fraser, Kitchener (CA); Mohammad Hossein Ordouei, Waterloo (CA)

(73) Assignee: Lakes Environmental Research Inc., Waterloo, ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/426,120

(22) Filed: Feb. 7, 2017

(65) Prior Publication Data

US 2017/0145326 A1 May 25, 2017

Related U.S. Application Data

(63) Continuation of application No. 14/694,375, filed on Apr. 23, 2015, now Pat. No. 9,605,212.

(30) Foreign Application Priority Data

Apr. 23, 2014 (CA) ..................................... 2849850

(51) Int. Cl.
*C10G 2/00* (2006.01)
*C10G 1/00* (2006.01)
(Continued)

(52) U.S. Cl.
CPC ................. *C10J 3/62* (2013.01); *C10B 53/06* (2013.01); *C10G 1/002* (2013.01); *C10G 1/02* (2013.01);
(Continued)

(58) Field of Classification Search
CPC ........ C10K 3/06; C10G 2/00; C10G 2400/02; C10G 2400/04; C10G 1/002; C10G 2/30;
(Continued)

(56) References Cited

U.S. PATENT DOCUMENTS 2,285,276 A  6/1942 Hemminger
4,264,431 A  4/1981 Ishikawa et al.
(Continued)

OTHER PUBLICATIONS

"A Fluidized Bed Retort for Oil Sands", Donnelly et al., 59 The Canadian Journal of Chemical Engineering 68-75 (Feb. 1981).
(Continued)

*Primary Examiner* — Jafar Parsa

(57) ABSTRACT

A method of processing raw oil sands material that includes bitumen. The method includes, in a predistillation process, heating the raw oil sands material to between approximately 535° C. and at least approximately 600° C. to at least partially vaporize the bitumen, to provide atmospheric gas oil and vacuum gas oil from the bitumen, and to provide coked oil sands material that includes carbon-heavy hydrocarbons and sand. The coked oil sands material is heated to approximately 900° C., to produce a dry barren hot oil sands material and syngas including hydrogen and carbon monoxide gases. Heat energy is transferred from at least a portion of the barren hot oil sands material to the raw oil sands material.

23 Claims, 11 Drawing Sheets

(51) Int. Cl.
  *C10G 1/02* (2006.01)
  *C10J 3/62* (2006.01)
  *C10B 53/06* (2006.01)
  *C10L 1/08* (2006.01)
  *C10L 1/06* (2006.01)
  *C10K 3/06* (2006.01)

(52) U.S. Cl.
  CPC .................. *C10G 2/30* (2013.01); *C10K 3/06* (2013.01); *C10L 1/06* (2013.01); *C10L 1/08* (2013.01); *C10G 2400/02* (2013.01); *C10G 2400/04* (2013.01); *C10J 2300/0946* (2013.01); *C10J 2300/0956* (2013.01); *C10J 2300/0976* (2013.01); *C10J 2300/1618* (2013.01); *C10J 2300/1659* (2013.01); *C10L 2270/023* (2013.01); *C10L 2270/026* (2013.01); *C10L 2290/04* (2013.01); *C10L 2290/06* (2013.01); *C10L 2290/42* (2013.01)

(58) Field of Classification Search
  CPC ... C10L 1/06; C10L 1/08; C10B 49/16; C10B 563/06; C10J 3/62; C10J 2300/0956; C10J 2300/0976; C10J 2300/1659; C10J 2300/1618; C10J 2300/0946
  See application file for complete search history.

(56) References Cited

U.S. PATENT DOCUMENTS

| | | |
|---|---|---|
| 4,337,143 A | 6/1982 | Hanson et al. |
| 4,507,195 A | 3/1985 | Spars et al. |
| 4,606,809 A | 8/1986 | Garg |
| 7,591,939 B2 | 9/2009 | Benham |
| 8,585,891 B2 | 11/2013 | Lourenco et al. |
| 8,790,508 B2 | 7/2014 | Koseoglu et al. |
| 9,169,443 B2 | 10/2015 | Kresnyak |
| 9,605,212 B2 | 3/2017 | The et al. |
| 2007/0125686 A1 | 6/2007 | Zheng et al. |

OTHER PUBLICATIONS

"Stoichiometric Approach to the Analysis of Coal Gasification Process", Kaiho et al., InTech, www.intechopen.com, 415-437 (Apr. 2012).

"Fluid Properties at Coking Process Conditions", Aminu et al., Ind. Eng. Chem. Res. 2004, 43, 2929-2935 (2004) (published Dec. 3, 2003).

"Investigation of the Coal Gasification Process Under Various Operating Conditions Inside a Two-Stage Entrained Flow Gasifier", Silaen et al., 4 Journal of Thermal Science and Engineering Applications 021006-1-021006-11 (Jun. 2012).

ULTRA-LOW WATER INPUT OIL SANDS RECOVERY PROCESS

CROSS-REFERENCE TO RELATED APPLICATION

This application is a continuation of U.S. patent application Ser. No. 14/694,375, filed on Apr. 23, 2015, and hereby incorporates such application in its entirety by reference.

FIELD OF THE INVENTION

The present invention is a system and a method for processing oil sands in which oil sands material is subjected to a predistillation process.

BACKGROUND OF THE INVENTION

As is well known in the art, the typical systems and methods for processing oil sands are relatively complex, and require significant water and energy inputs. In particular, the typical processes involve the use and contamination of large volumes of water and the creation of large waste (tailings) ponds. Large volumes of $CO_2$ emissions (and emissions of other gases, e.g., $NO_x$, $SO_x$, and $H_2S$) are generated by heating the large volumes of water by combustion of fossil fuels, to the extent that oil sands processing has become a major contributor of $CO_2$ emissions. Because the conventional systems and methods typically involve transporting oil sands, and waste sand resulting from the processing thereof, over relatively large distances, significant maintenance costs are also incurred due to the abrasion to which equipment is subjected.

A typical process of the prior art is schematically illustrated in FIG. 1. (As will be described, the balance of the drawings illustrate the present invention.) At the step identified as 21, oil sands are excavated. In step 22, the excavated oil sand is transported to the ore preparation plant 24, where the ore (i.e., excavated oil sand) is screened and crushed as required. As is well known in the art, various means may be used for the excavation of the oil sands and its transportation to the ore preparation plant 24.

In connection with conventional processing, hot water (typically heated by natural gas) is also added, at step 26. As is well known in the art, a large amount of water is used in this step. In step 28, a portion of the sand is separated from crude bitumen (i.e., liquid or semi-solid raw petroleum) in the oil sand. More hot water is added at the initial separation of sand and bitumen, at step 30. Following sedimentation (step 32), the waste is sent to a waste pond (step 34). The bitumen, and the portion of the sand remaining with the bitumen at this point, is then cleaned (step 36). In this step, the sand typically is cleaned with naphtha, to remove any bitumen remaining with the sand at this point. The sand removed in this step is also sent to sedimentation (step 38), and subsequently to the waste pond (step 40).

The bitumen remaining is then upgraded (step 42), and the bitumen is subsequently mixed with diluents to form "dilbit" (step 44). The diluents are less viscous than the bitumen, so that the viscosity of the dilbit is such that the dilbit can be pumped. The dilbit mixture of diluents and bitumen is then transported to a refinery (step 46), at which the bitumen and the diluents are separated, and the bitumen is refined to produce high-value products. Such high-value products include, for example, gasoline, diesel fuel, naphtha, and petrochemical feedstock.

The many disadvantages of the conventional processing described above are well known in the art. For instance, the conventional processes consume up to five barrels of water for every barrel of extracted bitumen. The waste ponds (also referred to as tailings ponds) required in connection with conventional processing cover large areas and emit toxic compounds such as volatile organic compounds and toxic effluents to the surrounding environment (e.g., into the Athabasca River). The widespread modified landscapes resulting from mining are also sources of harmful substances, and substantial costs are incurred in connection with reclamation efforts.

In addition, the diluents used in the dilbit (i.e., to reduce viscosity) are high-value products that could be profitably used elsewhere.

As is well known in the art, the dilbit typically is transported thousands of kilometers via pipeline or railroads. This necessity creates significant risks, the most important of which is the risk of environmental damage due to a break or leak. Because of the nature of the components of dilbit, a spill of dilbit into the environment typically has serious consequences. When dilbit is released in an uncontrolled manner, the dilbit is initially relatively less viscous (i.e., due to its diluents content), and readily drains into the ground or water near the pipeline. However, shortly after the dilbit's release and drainage into the ground, the diluents tend to escape into the atmosphere, ultimately resulting in a more viscous residue (consisting primarily of the bitumen in the dilbit) distributed in the soil or water. As a practical matter, remediation of the viscous residue is difficult.

The activities in a group identified as "A" in FIG. 1 typically may take place within distances in the order of about 10 kilometers. The activities in the group identified in FIG. 1 as group "B" conventionally are carried out at greater distances, e.g., such activities may be carried out at distances that are on the order of hundreds of kilometers apart. Also, the activities in group "C" usually are carried out at distances on the order of thousands of kilometers apart. Accordingly, to transport the materials in question requires additional energy consumption, adding to processing costs and also resulting in further $CO_2$ emissions.

SUMMARY OF THE INVENTION

There is a need for a system that overcomes or mitigates one or more of the disadvantages or defects of the prior art. Such disadvantages or defects are not necessarily included in those described above.

In its broad aspect, the invention provides a method of processing raw oil sands material that includes bitumen. The method includes subjecting an oil sands material including the raw oil sands material to a predistillation process that begins with heating the oil sands material to between approximately 350° C. and approximately 400° C., to produce atmospheric gas oil from the bitumen, and intermediate dried oil sands material. The intermediate dried oil sands material is heated to between approximately 535° C. and at least approximately 600° C., to produce vacuum gas oil and coked oil sands material that includes carbon-heavy hydrocarbons and sand. The coked oil sands material is heated to approximately 900° C., to produce a dry barren hot oil sands material and syngas including hydrogen and carbon monoxide gases. Heat energy is transferred from at least a portion of the barren hot oil sands material to at least one of the oil sands material and the intermediate dried oil sands material.

In another of its aspects, the invention provides a method of processing raw oil sands material that includes free water and bitumen, produced from a mine. The method includes preheating a preheat oil sands material including the raw oil sands material to between approximately 100° C. and approximately 150° C. to convert the free water to steam, to release the free water from the raw oil sands material and to form a dried oil sands material from the preheat oil sands material. In a first predistillation step, the dried oil sands material is heated to between approximately 350° C. and approximately 400° C. to partially vaporize the bitumen, to provide atmospheric gas oil from the bitumen, and intermediate dried oil sands material. In a second predistillation step, the intermediate dried oil sands material is heated to between approximately 535° C. and at least approximately 600° C. to further at least partially vaporize the bitumen, to provide vacuum gas oil, and coked oil sands material that includes carbon-heavy hydrocarbons and sand. In a gasifier, the coked oil sands material is heated to approximately 900° C. for gasification thereof, to provide syngas including hydrogen and carbon monoxide gases retaining syngas heat energy therein, and a dry barren hot oil sands material retaining sand heat energy therein. Heat energy is transferred from at least a portion of the barren hot oil sands material to at least one of the preheat oil sands material and the dried oil sands material and the intermediate dried oil sands material.

In another aspect, the invention provides a method of processing raw oil sands material that includes free water and bitumen, produced from a mine. The method includes preheating a preheat oil sands material including the raw oil sands material to between approximately 100° C. and approximately 150° C. to convert the free water to steam, to release the free water from the raw oil sands material and to form a dried oil sands material from the preheat oil sands material. In a predistillation process, the dried oil sands material is heated to between approximately 535° C. and at least approximately 600° C. to at least partially vaporize the bitumen, to provide atmospheric gas oil and vacuum gas oil from the bitumen, and to provide coked oil sands material that includes carbon-heavy hydrocarbons and sand. In a gasifier, the coked oil sands material is heated to approximately 900° C. for gasification thereof, to provide syngas including hydrogen and carbon monoxide gases retaining syngas heat energy therein, and a dry barren hot oil sands material retaining sand heat energy therein. Heat energy is transferred from at least a portion of the barren hot oil sands material to at least one of the preheat oil sands material and the dried oil sands material.

In yet another of its aspects, the invention provides a method of processing raw oil sands material including bitumen. The method includes, in a predistillation process, heating the raw oil sands material to between approximately 535° C. and at least approximately 600° C. to at least partially vaporize the bitumen, to provide atmospheric gas oil and vacuum gas oil from the bitumen, and to provide coked oil sands material that includes carbon-heavy hydrocarbons and sand. The coked oil sands material is heated to approximately 900° C., to produce a dry barren hot oil sands material, and syngas including hydrogen and carbon monoxide gases. Heat energy is transferred from at least a portion of the barren hot oil sands material to the raw oil sands material.

BRIEF DESCRIPTION OF THE DRAWINGS

The invention will be better understood with reference to the attached drawings, in which.

DETAILED DESCRIPTION

Figure 1:
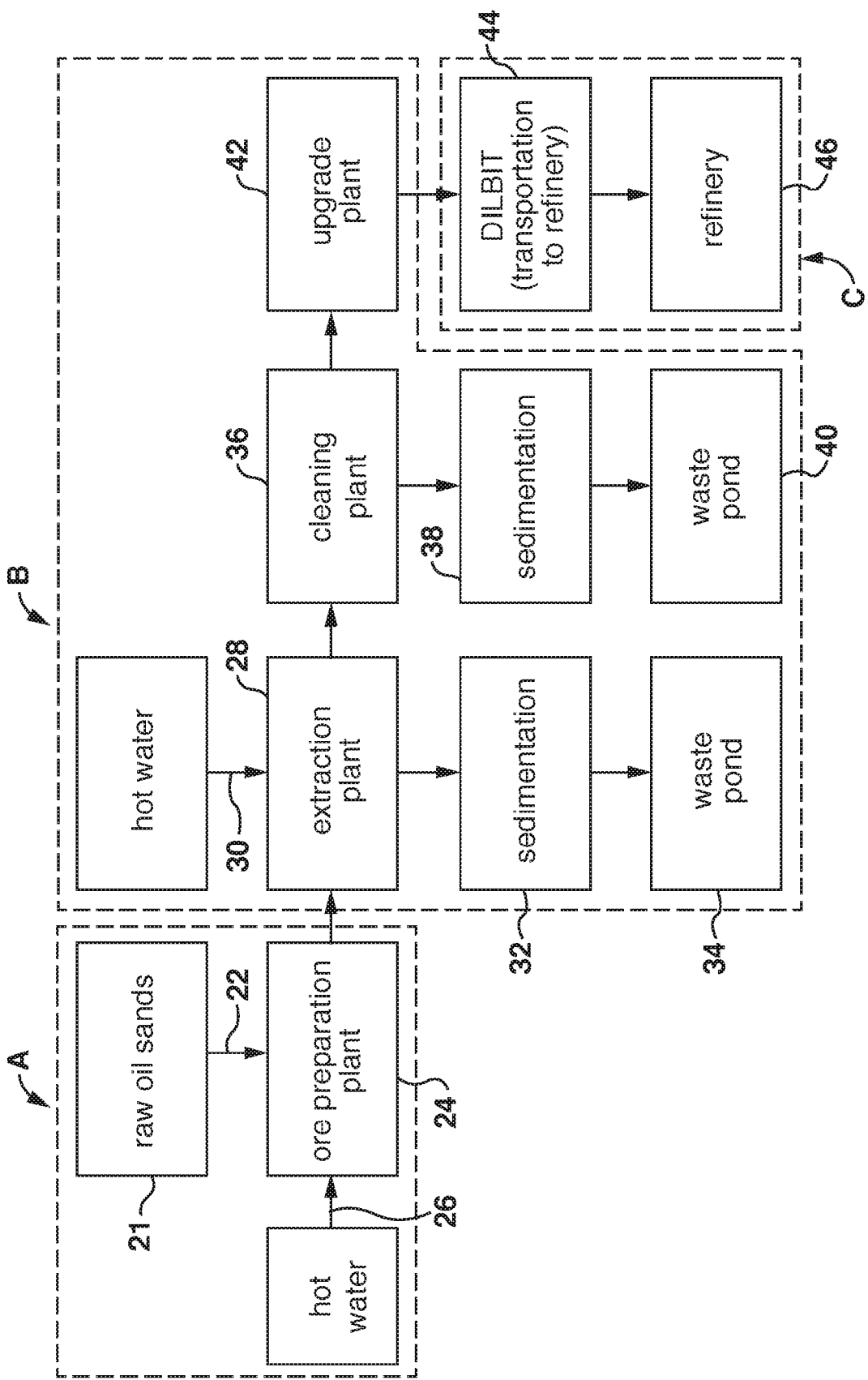
FIG. 1 (also described previously) is a block diagram illustrating steps of the conventional process.
Figure 2A:
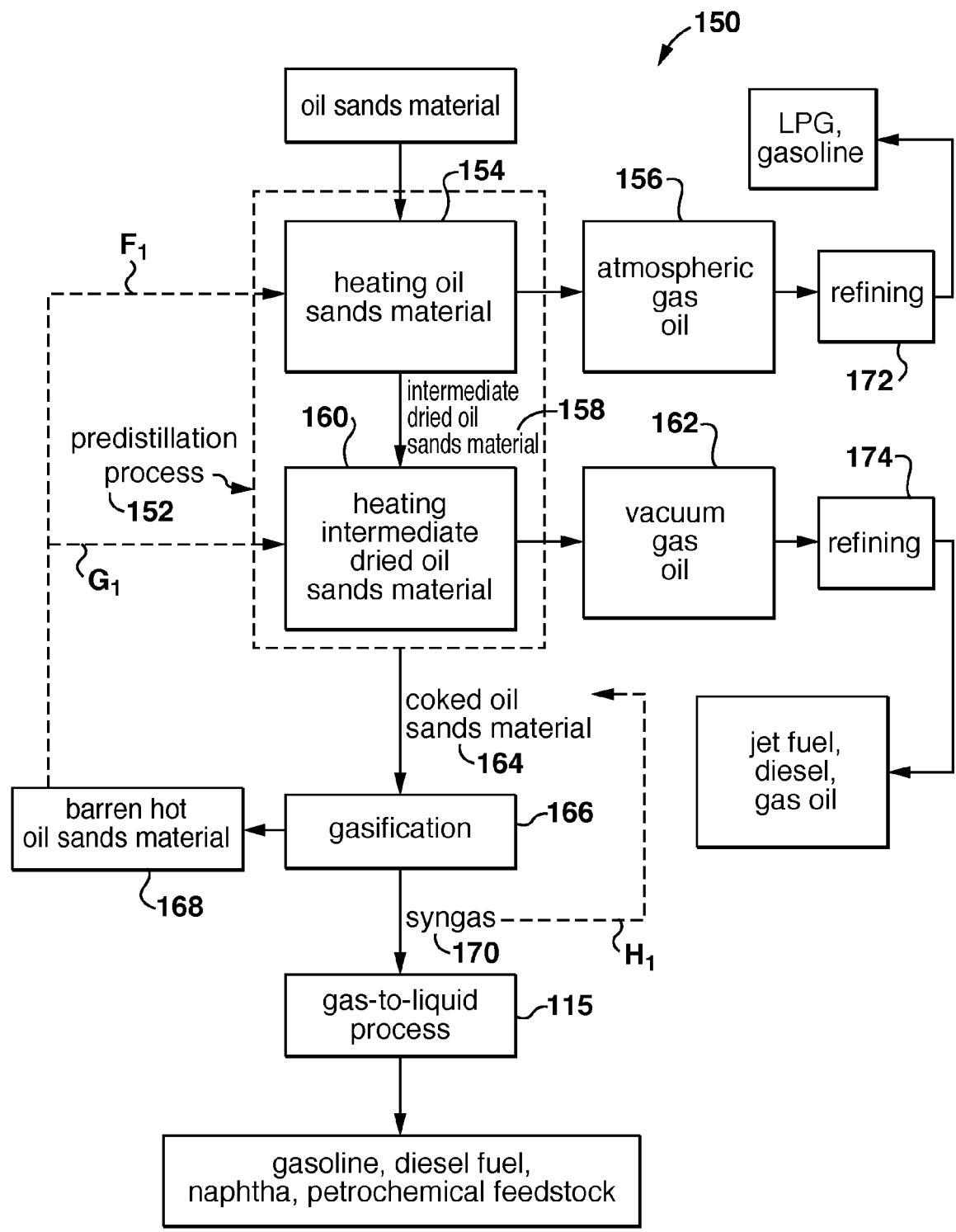
FIG. 2A is a block diagram illustrating an embodiment of a method of the invention.

In the attached drawings, like reference numerals designate corresponding elements throughout. Reference is first made to FIG. 2A to describe an embodiment of a method in accordance with the invention indicated generally by the numeral 150. In FIG. 2A, the method 150 of the invention is illustrated by an operational flow chart. The method 150 is for processing oil sands material 151 including bitumen, and includes subjecting the oil sands material 151 to a predistillation process 152. In one embodiment, the oil sands material 151 preferably is heated to between approximately 350° C. and approximately 400° C. (step 154), to produce atmospheric gas oil 156 from the bitumen, and intermediate dried oil sands material 158. Preferably, the intermediate dried oil sands material 158 is heated to between approximately 535° C. and at least approximately 600° C. (step 160), to produce vacuum gas oil 162 and coked oil sands material 164 including carbon-heavy hydrocarbons and sand. It is also preferred that the coked oil sands material 164 is subjected to gasification (step 166), to produce barren hot oil sands material 168, and syngas 170 including hydrogen and carbon monoxide gases.

In one embodiment, the atmospheric gas oil 156 preferably is refined (FIG. 2A, step 172) to provide one or more of liquefied petroleum gas (LPG) and gasoline. It is also preferred that the vacuum gas oil 162 is refined (step 174) to provide one or more of jet fuel, diesel fuel, and gas oil.

Because of the temperature gradient of the predistillation process 152, the atmospheric gas oil 156 and the vacuum gas oil 162 are produced sequentially in the process. The atmospheric gas oil 156 and the vacuum gas oil 162 therefore may be captured substantially separately, and subsequently processed (i.e., refined) separately, in steps 172 and 174 respectively.

Alternatively, it is possible to subject the oil sands material 151 to a predistillation process in which the atmospheric gas oil and the vacuum gas oil are not captured separately. For example, the oil sands material 151 may be heated to between approximately 535° C. and at least approximately 600° C., producing a mixture of the volatiles (i.e., a mixture of the atmospheric gas oil and the vacuum gas oil). In these circumstances, the atmospheric gas oil would be produced when the oil sands material is heated to between approximately 350° C. and approximately 400° C., and the vacuum gas oil would be produced when the oil sands material is further heated to between approximately 535° C. and at least approximately 600° C. In this alternative arrangement, the atmospheric gas oil and the vacuum gas oil would then be subjected to further processing together, to produce various petroleum products. Although this alternative may impose some limitations or additional requirements in the further processing of the atmospheric gas oil and the vacuum gas oil, it may be acceptable in some circumstances.

In one embodiment, the syngas 170 preferably is further subjected to one or more gas-to-liquid processes (step 115) to provide one or more of gasoline, diesel fuel, naphtha, and petrochemical feedstock.

In summary, in the method of the invention, volatiles (in the form of the atmospheric gas oil and the vacuum gas oil) are removed from oil sands material including bitumen by heating the oil sands material, in a predistillation process. The volatiles may be further processed to produce petroleum products. Coked oil sands material is also produced from the predistillation process. The coked oil sands material is subjected to a gasification process, in which molecule-changing chemical reactions provide a syngas that also may be further processed to produce petroleum products. Advantageously, the invention does not require the large inputs of water that are required in the prior art. Once the methods of the invention are functioning in a steady state, the energy requirements may be satisfied to a large extent by recovering energy from different products and by-products of the methods.

Figure 2B:
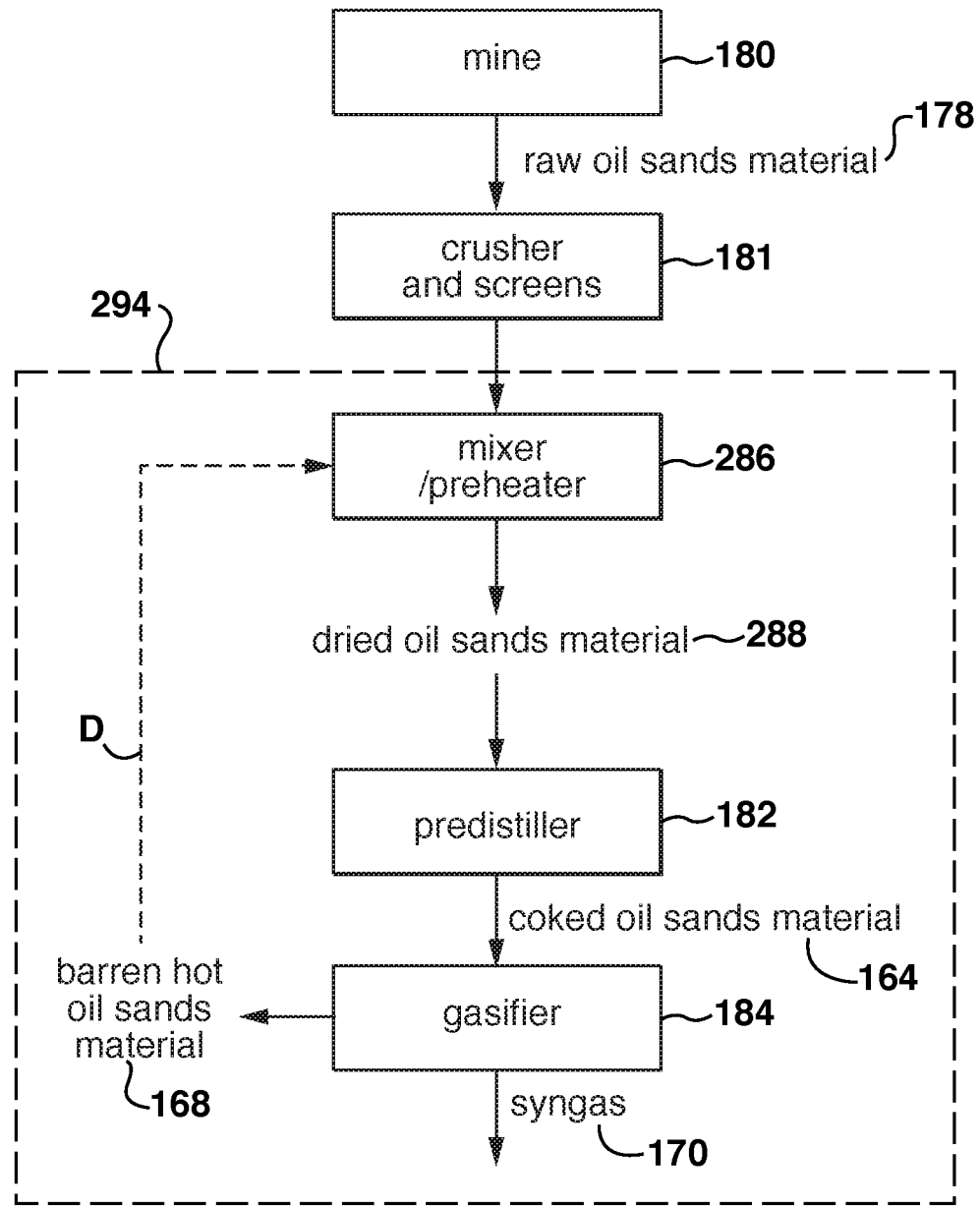
FIG. 2B is a block diagram illustrating an embodiment of a system of the invention.

It will be understood that the oil sands material 151 preferably includes raw oil sands material 178, produced from a mine 180 (FIG. 2B). It is believed that, as a practical matter, comminution and screening of the oil sands material would generally be desirable. As will be described, the oil sands material 151 preferably is comminuted to a predetermined particle size range prior to subjecting the oil sands material 158 to the predistillation process 152. The comminution and screening preferably is effected via one or more crushers and screens referred to generally by reference numeral 181 in FIG. 2B. Those skilled in the art would appreciate that the predetermined particle size range is determined based on a number of factors, e.g., energy consumption. The size of the particles is reduced to an optimum particle size range, to increase the surface area of the particles, and also for exposure of the bitumen, for its ultimate release.

Preferably, and as illustrated in FIG. 2B, the raw oil sands material 178 is comminuted, prior to preheating, and screened so that only the particles of the raw oil sands material 178 below a predetermined particle size are included in the oil sand material.

Those skilled in the art would also appreciate that the "sand" component of the oil sands may include various rock and soil materials, e.g., both sand (i.e., relatively small rock and/or mineral particles) and clay. As is also well known in the art, in addition to the bitumen thereof, the oil sands material typically also includes free water. The free water content varies, depending on a number of factors. For example, the free water content may be approximately 4 percent by weight.

Figure 2C:
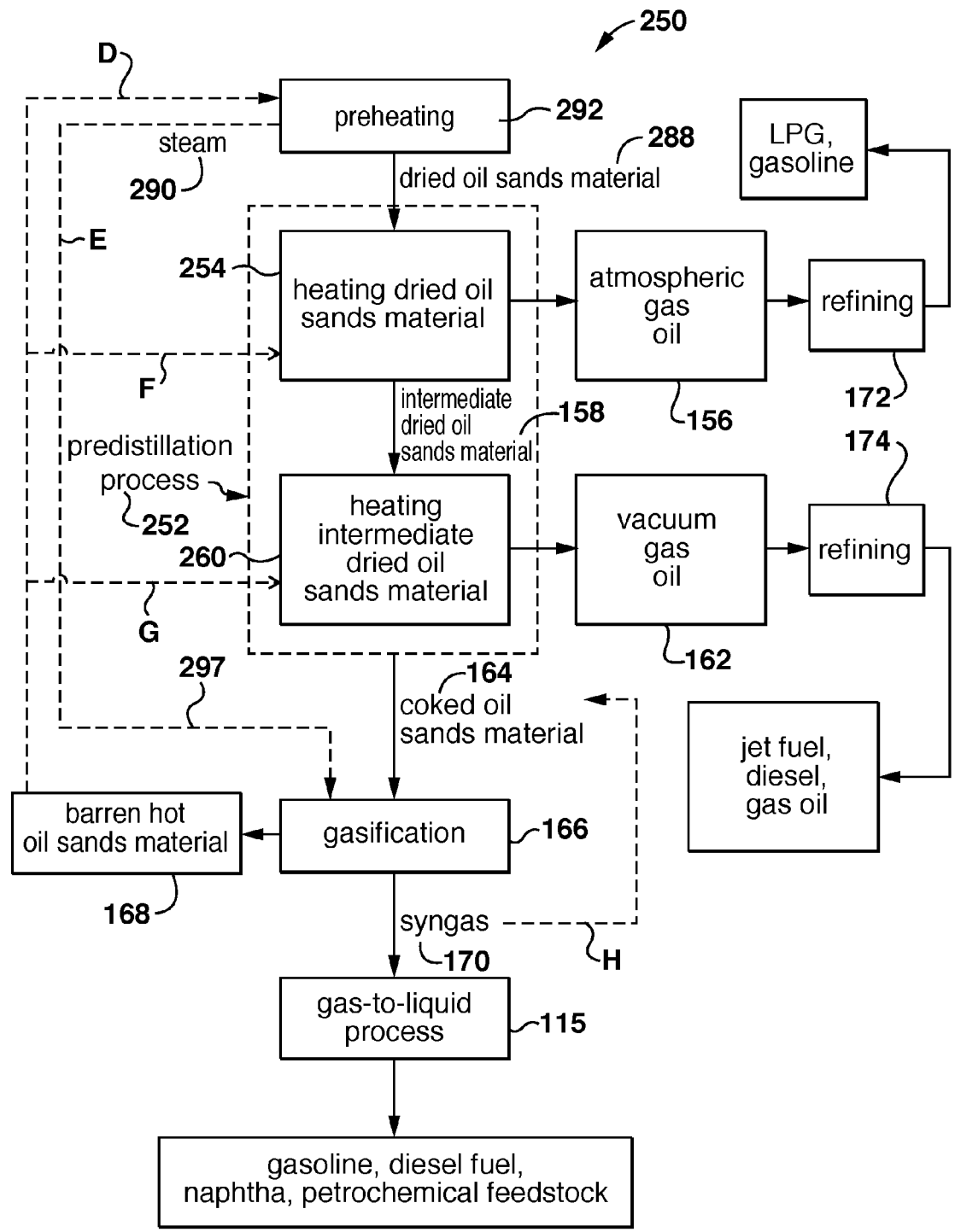
FIG. 2C is a block diagram illustrating an alternative embodiment of a method of the invention.
Figure 2D:
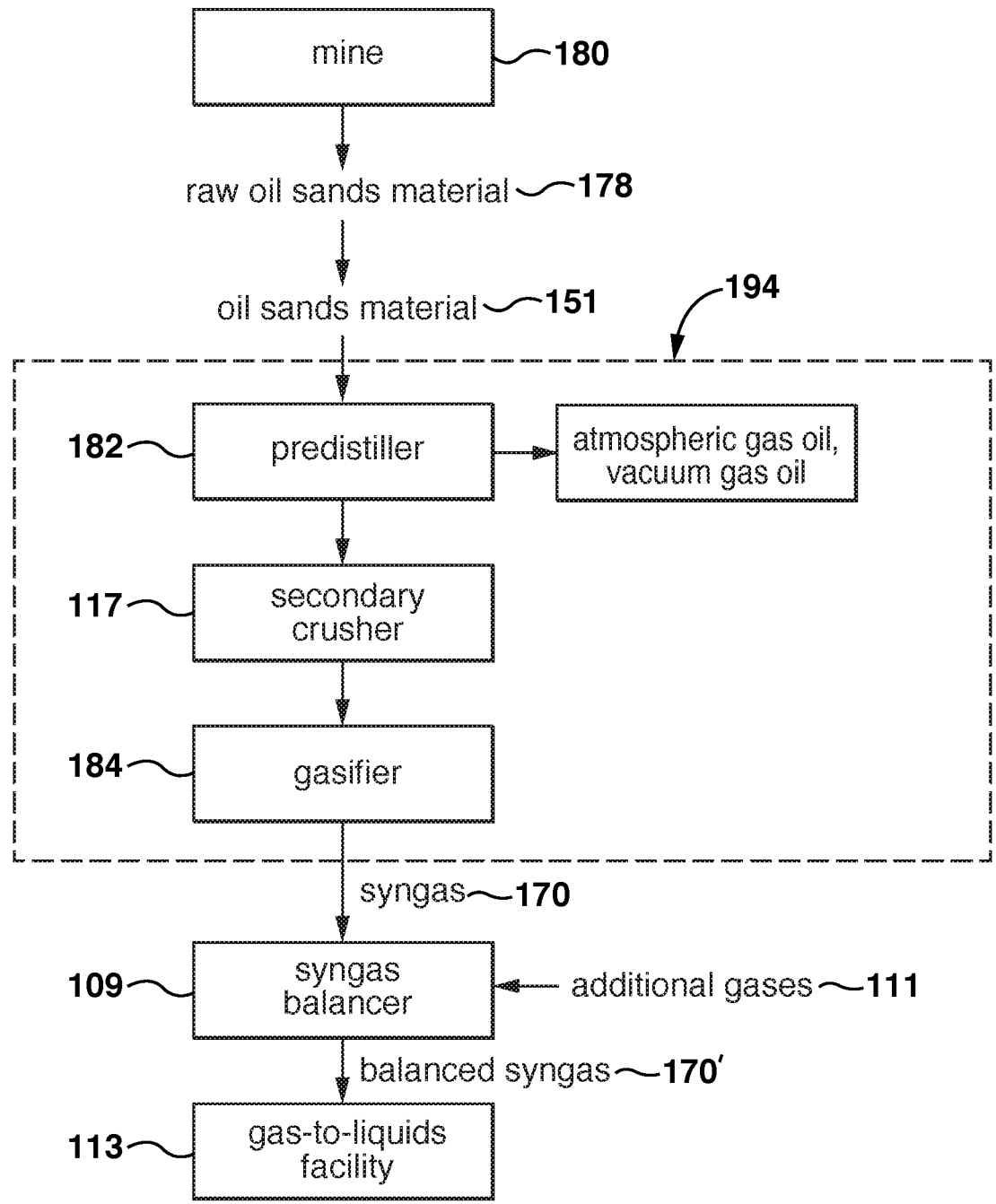
FIG. 2D is a block diagram illustrating an alternative embodiment of a system of the invention.

An embodiment of a system 194 of the invention is schematically illustrated in FIG. 2D. The system 194 is for processing raw oil sands material 178 including free water and bitumen produced from the mine 180 in accordance with the method 150 of the invention. In one embodiment, the system 194 preferably includes a predistiller 182 in which the oil sands material 151 including the raw oil sands material 178 is heated to between approximately 350° C. and approximately 400° C. in a first predistillation process, to produce atmospheric gas oil 156 from the bitumen, and intermediate dried oil sands material 158, and in which the intermediate dried oil sands material 158 is heated to between approximately 535° C. and at least approximately 600° C. to produce vacuum gas oil 162 and coked oil sands material 164 including carbon-heavy hydrocarbons and sand (FIG. 2A). The system 194 also includes a gasifier 184 in which the coked oil sands material 164 is heated to approximately 900° C. to gasify the carbon-heavy hydrocarbons, to produce syngas 170 including hydrogen and carbon monoxide gases and barren hot oil sands material 168 (FIG. 2A).

As will be described, in embodiments of the invention, heat energy is at least partially recoverable from certain products of the methods of the invention, and utilized elsewhere in the invention. Also, in certain circumstances (described below), the introduction of additional materials or substances retaining heat energy (e.g., hot air, or steam) may be advantageous. The recovery of part of the heat energy from certain products of the invention, and the utilization of heat energy from steam or hot air introduced into the system, preferably is effected via an energy recovery system ("ERS").

In an alternative embodiment of the system 294 (FIG. 2B), the system 294 additionally includes a preheater 286 in which the oil sands material 151 is preheated before the preheated (i.e., dried) oil sands material 288 is moved into a predistiller 182. The system 294 is for processing the oil sands material 151 in accordance with an alternative embodiment of a method 250 of the invention (FIG. 2C), as will be described.

For instance, in one embodiment, the appropriately sized raw oil sands material 178 preferably is mixed in the mixer/preheater 286 (FIG. 2B) with the barren hot oil sands material 168 to provide dried oil sands material 288. Before it is introduced into the mixer/preheater 286, the temperature of the raw oil sands material is substantially the same as the ambient atmospheric temperature. Because the barren hot oil sands material 168 is relatively hot, however, upon the mixture thereof with the raw oil sands material in the mixer/preheater 286, heat is transferred from the barren hot oil sands material 168 to the raw oil sands material 178. For instance, the raw oil sands material 178 may have a temperature of approximately 25° C., and the barren hot oil sands material 168 may have a temperature of approximately 900° C., when it exits the gasifier 184. The temperature of the dried oil sands material 288 exiting the mixer/preheater 286 may be, for example, approximately 90° C. Those skilled in the art would appreciate that, to the extent that heat energy in the barren hot oil sands material 168 is recovered, the energy inputs required during the predistillation process 152 are reduced.

In an alternative embodiment schematically illustrated in FIG. 2C, the invention provides the method 250 of processing the raw oil sands material 178. The raw oil sands material 178 includes the free water and the bitumen and is produced from the mine 180, as noted above. The method 250 preferably includes preheating the oil sands material 151 (which includes the raw oil sands material 178) to between approximately 100° C. and approximately 150° C., to provide the dried oil sands material 288 (FIG. 2C, step 292). As noted above, the preheating may be effected, for example, by mixing at least a portion of the barren hot oil sands material 168 with the raw oil sands material 178. The movement of the barren hot oil sands material 168 from the gasifier 184 to the mixer/preheater 286 for this purpose is schematically represented by arrow "D" in FIGS. 2B, 2C. In addition to transferring heat to the raw oil sands material 178, the preheating converts the free water to steam 290. In this way, the free water is released from the oil sands material 151. Preferably, in a first predistillation step 254 of a predistillation process 252, the dried oil sands material 288 is heated in the predistiller 182 to between approximately 350° C. and approximately 400° C. to partially vaporize the bitumen, to provide the atmospheric gas oil 156 from the bitumen, and also to provide the intermediate dried oil sands material 158. In a second predistillation step 260, the intermediate dried oil sands material 158 preferably is heated to between approximately 535° C. and at least approximately 600° C. to further at least partially vaporize the bitumen, to provide the vacuum gas oil 162, and also to provide the coked oil sands material 164. As noted above, the coked oil sands material 164 includes carbon-heavy hydrocarbons and sand. It will be understood that the atmospheric gas oil 156 and the vacuum gas oil 162 are refined in separate steps 172, 174, to produce respective high value products therefrom, as indicated in FIG. 2C.

It is also preferred that the method 250 additionally includes the step of, in the gasifier 184 (FIG. 2D), heating the coked oil sands material 164 to approximately 900° C. for gasification thereof, to provide the syngas 170, and the barren hot oil sands material 168. The syngas 170 includes hydrogen and carbon monoxide gases and retains syngas heat energy therein. The barren hot oil sands material 168 retains sand heat energy therein. (FIG. 2C, step 166). Upon exiting the gasifier 184, each of the syngas 170 and the barren hot oil sands material 168 is at a temperature of approximately 900° C. Accordingly, at that point, each of the syngas 170 and the barren hot oil sands material 168 retains substantial heat energy respectively.

In one embodiment, the steam 290 preferably is added to the coked oil sands 164 during the gasification thereof, to provide at least a portion of the hydrogen gas in the syngas 170 (FIG. 2C). The injection of the steam 290 into the gasifier 184 is schematically represented by the dashed arrow "E" in FIG. 2C. It will be understood that utilizing the steam 290 in this way results in a recovery of some of the heat energy used to generate the steam.

In another embodiment, and as noted above, the oil sands material 151 preferably also includes at least a portion of the barren hot oil sands material 168, and the preheating is at least partially effected by transfer of a portion of the sand heat energy to the raw oil sands material 178 (FIG. 2C). The recycling of at least part of the barren hot oil sands material 168 to the preheater 286 is schematically illustrated by arrow "D" in FIGS. 2B and 2C. Those skilled in the art would appreciate that the transfer of heat from the barren hot oil sands material 168 to the raw oil sands material 178 may be effected via any suitable heat transfer method(s).

In another alternative embodiment, at least a portion of the heat energy in the barren hot oil sands material 168 preferably is transferred to the dried oil sands material 288 (FIG. 2C). The recycling of the barren hot oil sands material 168 to the first predistillation step 154 is schematically illustrated in FIG. 2C by arrow "F". Those skilled in the art would appreciate that the transfer of heat from the barren hot oil sands material 168 to the dried oil sands material 288 may be effected via any suitable heat transfer method(s).

It will be understood that, in connection with the method 150 of the invention, the barren hot oil sands material 168 may be recycled to the first predistillation step 154, to recover at least a portion of the heat energy retained in the barren hot oil sands material 168. In FIG. 2A, the recycling of the barren hot oil sands material 168 to the first predistillation step 154, to transfer heat therefrom to the oil sands material 151, is schematically illustrated by arrow "F₁". Those skilled in the art would appreciate that the transfer of heat from the barren hot oil sands material 168 to the oil sands material 151 in the first predistillation step 154 may be effected via any suitable heat transfer method(s).

It is also preferred that at least a portion of the heat energy in the barren hot oil sands material 168 is transferred to the intermediate dried oil sands material 158 (FIG. 2C). In FIG. 2C, the recycling of the barren hot oil sands material 168 to the second predistillation step 160, to transfer heat therefrom to the intermediate oil sands material 158, is schematically illustrated by arrow "G". Those skilled in the art would appreciate that such heat transfer may be effected via any suitable method(s).

It will be understood that a portion of the heat energy in the barren hot oil sands material 168 may also be utilized in the second predistillation step 160 of the method 150. In FIG. 2A, the recycling of the barren hot oil sands material 168 to the second predistillation step 160, to transfer heat therefrom to the intermediate oil sands material 158, is schematically illustrated by arrow "G₁". Those skilled in the art would appreciate that such heat transfer may be effected via any suitable method(s).

It is also preferred that, prior to the gasification of the coked oil sands material 164, at least a portion of the syngas heat energy from previously produced syngas 170 is transferred to the coked oil sands material 164, to heat the coked oil sands material 164 to between approximately 650° C. and approximately 750° C. (FIG. 2C). In FIG. 2C, the recycling of the barren hot oil sands material 168 to heat the coked oil sands 164, to transfer heat therefrom to the coked oil sands material 164, is schematically illustrated by arrow "H". Those skilled in the art would appreciate that such heat transfer may be effected via any suitable method(s).

It will be understood that a portion of the heat energy in the barren hot oil sands material 168 may also be utilized to heat the coked oil sands material 164 in the method 150, illustrated in FIG. 2A. In FIG. 2A, the recycling of the barren hot oil sands material 168 to heat the coked oil sands 164, to transfer heat therefrom to the coked oil sands material 164, is schematically illustrated by arrow "H₁". Those skilled in the art would appreciate that such heat transfer may be effected via any suitable method(s).

Other means for adding heat energy at selected points in the method of the invention may be advantageous, depending on the circumstances. For instance, in one embodiment, the method of the invention preferably also includes heating fresh water (FIG. 2E, step 301) to between approximately 450° C. and approximately 500° C. to generate fresh water steam 303 (FIG. 2E), and injecting the fresh water steam 303 into the gasifier 184 (FIG. 2C, step 297). It will be understood that the steam may be generated using any suitable source of heat. Preferably, the steam is generated utilizing heat transferred from the hot syngas 170 and/or from the barren hot oil sands material 168. Those skilled in the art would appreciate that heating fresh water to provide fresh water steam may be an additional step in either of the methods 150 or 250 of the invention described above.

Figure 2E:
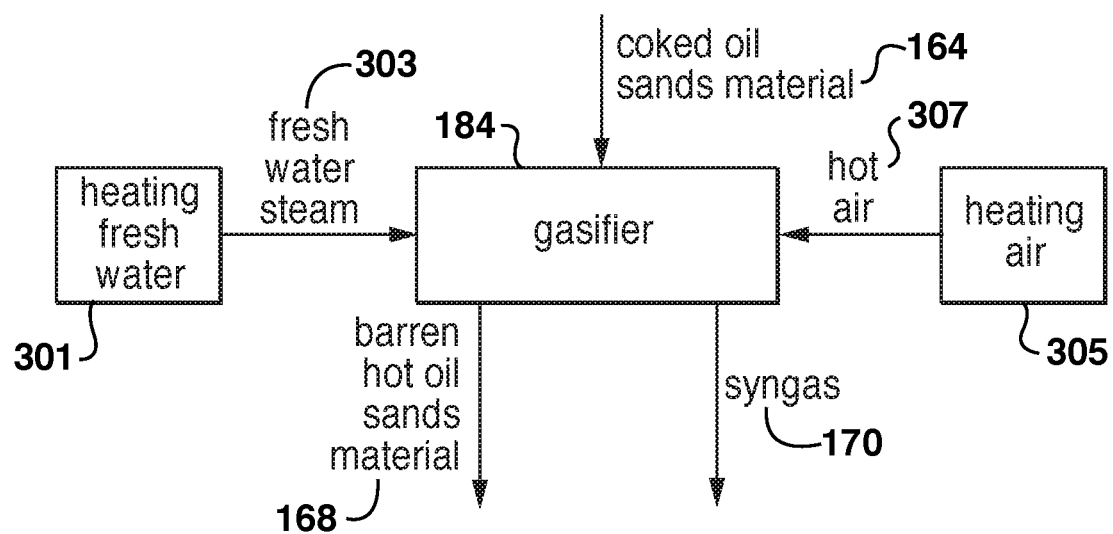
FIG. 2E is a block diagram illustrating additional alternative inputs into the gasification step of the invention.

In another embodiment of the method of the invention, air preferably is heated to between approximately 650° C. and approximately 750° C. (FIG. 2E, step 305) to generate hot air 307 (FIG. 2E), and injecting the hot air into the gasifier 184 (FIG. 2E). It will be understood that the hot air may be generated using any suitable source of heat. Preferably, the air is heated utilizing heat transferred from the hot syngas 170 and/or from the barren hot oil sands material 168. Those skilled in the art would appreciate that heating air to provide hot air may be an additional step in either of the methods 150 or 250 of the invention described above.

Those skilled in the art would appreciate that the composition of the syngas 170 as generated by gasification may not be consistent with a desired composition (i.e., desired for purposes of further processing). The composition of the syngas 170 may be altered in a syngas balancer 109 (FIG. 2D). In one embodiment, the method 150 of the invention preferably includes mixing the syngas 170 with one or more additional gases 111 to produce a balanced syngas 170' that includes preselected gases in predetermined proportions (FIG. 2D). It will be understood that the further processing of the syngas 170' may be any suitable processing.

However, it has been determined that, in one embodiment, the additional gas(es) 111 preferably includes a natural gas-derived syngas resulting from combustion of natural gas.

As an example, it may be intended to direct the syngas 170 to a gas-to-liquids facility 113 (FIG. 2D). Preferably, the balanced syngas is subjected to a gas-to-liquids process 115 to provide one or more of gasoline, diesel fuel, naphtha, and petrochemical feedstock.

Those skilled in the art would appreciate that the syngas 170 and/or the balanced syngas 170' may be processed in any suitable way, in any suitable facility. The gas-to-liquids facility is one example of a facility in which the syngas and/or balanced syngas may be further processed.

It may be necessary or advisable to utilize one or more secondary crushers 117, to provide the coked oil sands material 164 in a form suitable for gasification. As illustrated in FIG. 2D, an embodiment of the system 194 of the invention preferably includes the secondary crusher 117, for comminuting the coked oil sands material 164 so that only the coked oil sands material 164 below a preselected particle size are subjected to the gasification. Those skilled in the art would appreciate that the preselected particle size is determined based on a number of factors, e.g., energy consumption. The size of the particles is reduced to an optimum particle size range, to increase the surface area of the particles, and also for exposure of the carbon-heavy hydrocarbons. It will be understood that, although the secondary crusher 117 may be considered optional, as a practical matter, it may be required to make the coked oil sands material 164 suitable for gasification.

It will also be understood that, in one embodiment, the barren hot oil sands material 168 preferably is transported to the mine 180 for backfilling therein. Those skilled in the art would appreciate that the barren hot oil sands material 168 would have the advantage (i.e., over backfilling using the prior art materials) that it is accompanied by virtually no water.

Figure 3:
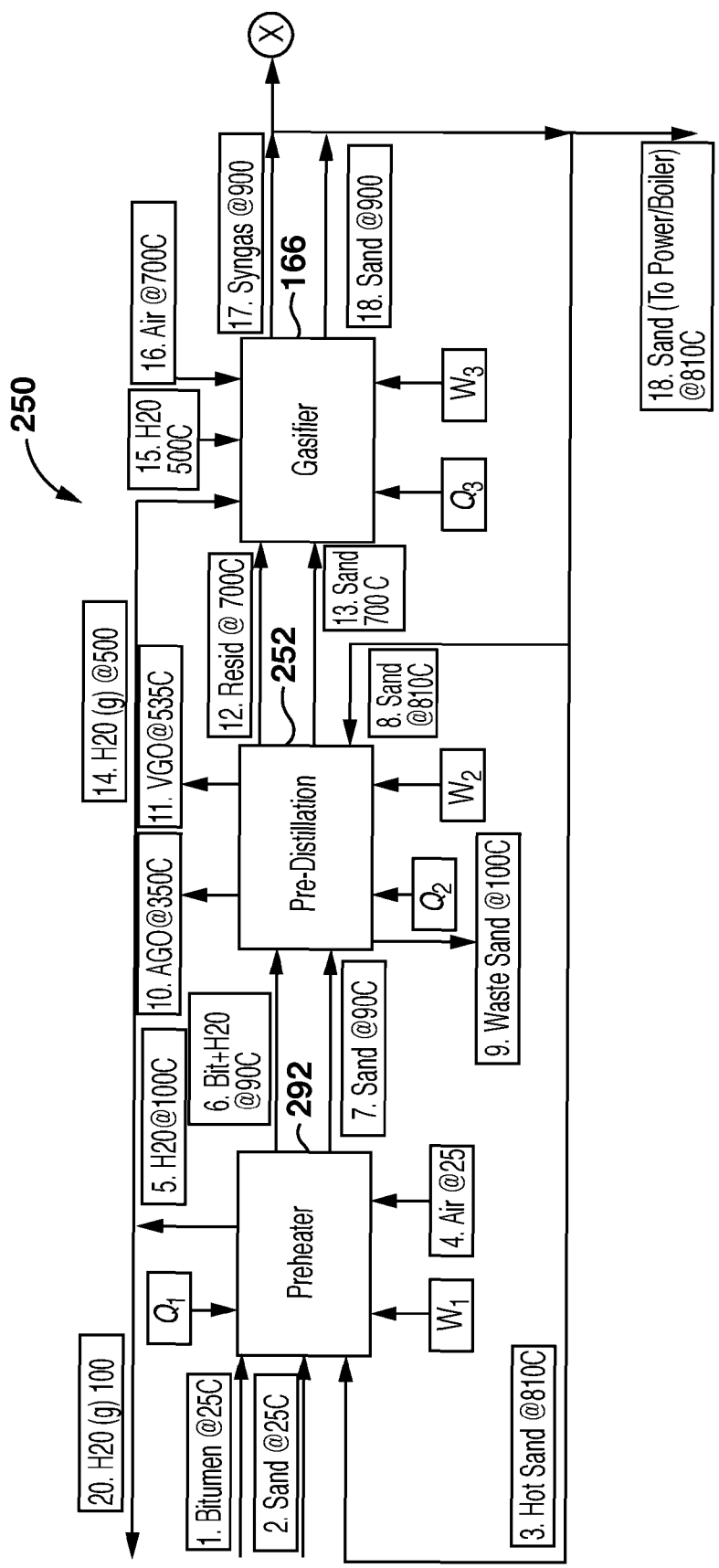
FIG. 3 is a block diagram illustrating an alternative embodiment of a method of the invention.
Figure 4:
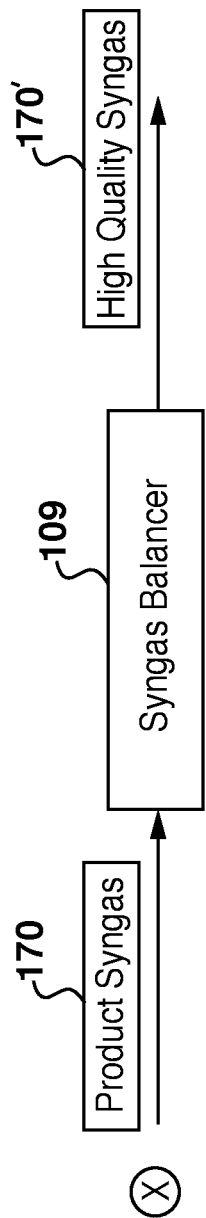
FIG. 4 is a block diagram illustrating a part of an alternative embodiment of a method of the invention.
Figure 5:
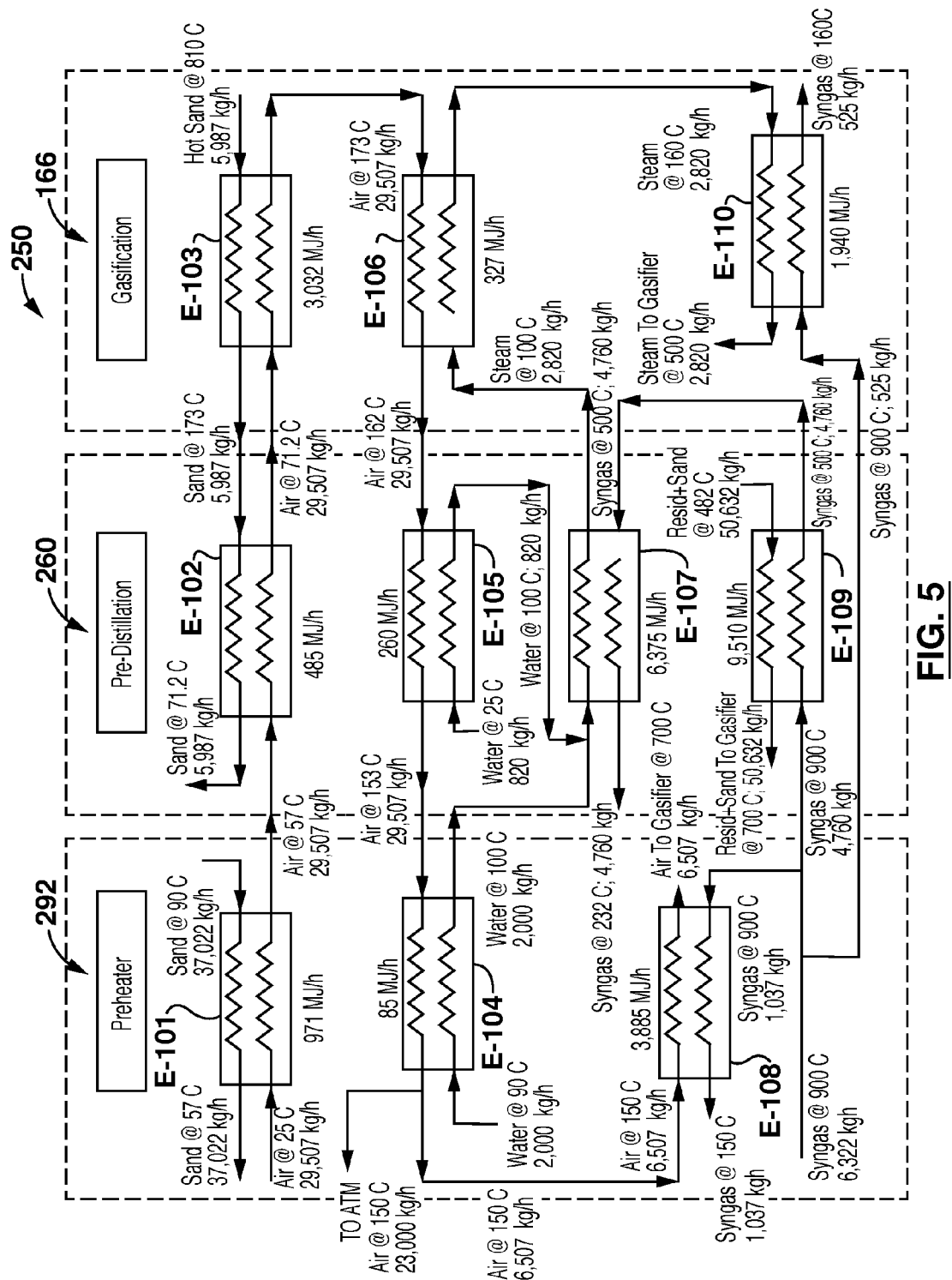
FIG. 5 is a block diagram illustrating an alternative embodiment of a method of the invention.

The method 250 of the invention was modeled, and the results are provided in Tables 1 and 2 below. The results are also schematically illustrated in FIGS. 3-5. (The data set out in Table 1 is schematically illustrated in FIGS. 3 and 4, and the data set out in Table 2 is schematically illustrated in FIG. 5.) Based on the modeling, the methods of the invention appear to offer a number of advantages, as will be described.

TABLE 1

Material and Energy Balance for an embodiment of the Method of the Invention Including Temperature Ranges.

| No. | Streams | T, C | Temperature Range, C. | M (kg/h) | Pressure Range, kPa |
|---|---|---|---|---|---|
| 1 | Bitumen | 25 | 25 | 5,000 | 100 |
| 2 | Sand | 25 | 25 | 45,000 | 100 |
| 3 | Hot Sand | 900 | 800-900 | 5,032 | 100 |
| 4 | Air | 25 | 25 | — | 100 |
| 5 | Water Vapor | 100 | 100-150 | 2,000 | 80-100 |
| 6 | Bitumen-$H_2O$ | 100 | 100-150 | 5,000 | 100 |
| 7 | Sand | 100 | 100-150 | 48,032 | 100 |
| 8 | Hot Sand | 900 | 800-900 | 37,022 | 100 |
| 9 | Hot Sand | 100 | 100-150 | 37,022 | 100 |
| 10 | AGO | 350 | 350-400 | 850 | 80-100 |
| 11 | VGO | 535 | 535-600 | 1,550 | 80-100 |
| 12 | Resid | 700 | 700-750 | 2,600 | 100 |
| 13 | Sand | 700 | 700-750 | 48,032 | 100 |
| 14 | $H_2O$ (Steam) | 500 | 450-500 | 2,000 | 100-150 |
| 15 | $H_2O$ (Steam) | 500 | 450-500 | 820 | 100-150 |
| 16 | Air | 700 | 700-750 | 6,507 | 100-150 |
| 17 | Syngas | 900 | 800-900 | 11,927 | 100 |
| 18 | Hot Sand | 900 | 800-900 | 48,032 | 100 |
| 19 | Hot Sand | 900 | 800-900 | 5,978 | 100 |
| 20 | Water Pond | 100 | 70-100 | — | 80-100 |

TABLE 2

Energy Stream and Exit Temperature Ranges of Inlet and Outlet Streams of Heat Recovery.

| No. | Heat Exchanger | Energy Stream, MJ/h | Exit Temperature Range, C. |
|---|---|---|---|
| 1 | E-101 | 970-1,846 | 57-87.3 |
| 2 | E-102 | 485-521 | 71.2-104.8 |
| 3 | E-103 | 3,032-3,318 | 173-214.4 |
| 4 | E-104 | 85-87 | Air: 150-186 Water: 90-100 |
| 5 | E-105 | 260-275 | Air: 153-188.9 Water: 25-100 |
| 6 | E-106 | 327-515 | Air: 162-197.4 Steam: 160-204 |
| 7 | E-107 | 6,375 | Water Phase Change@ 100 C. Syngas: 232-231.9 |
| 8 | E-108 | 3,885-3,765 | Air: 700-747.7 Syngas: 900-176 |
| 9 | E-109 | 9,510 | — |
| 10 | E-110 | 1,940 | Steam: 500-540 Syngas: 160-197.4 |

Figure 6:
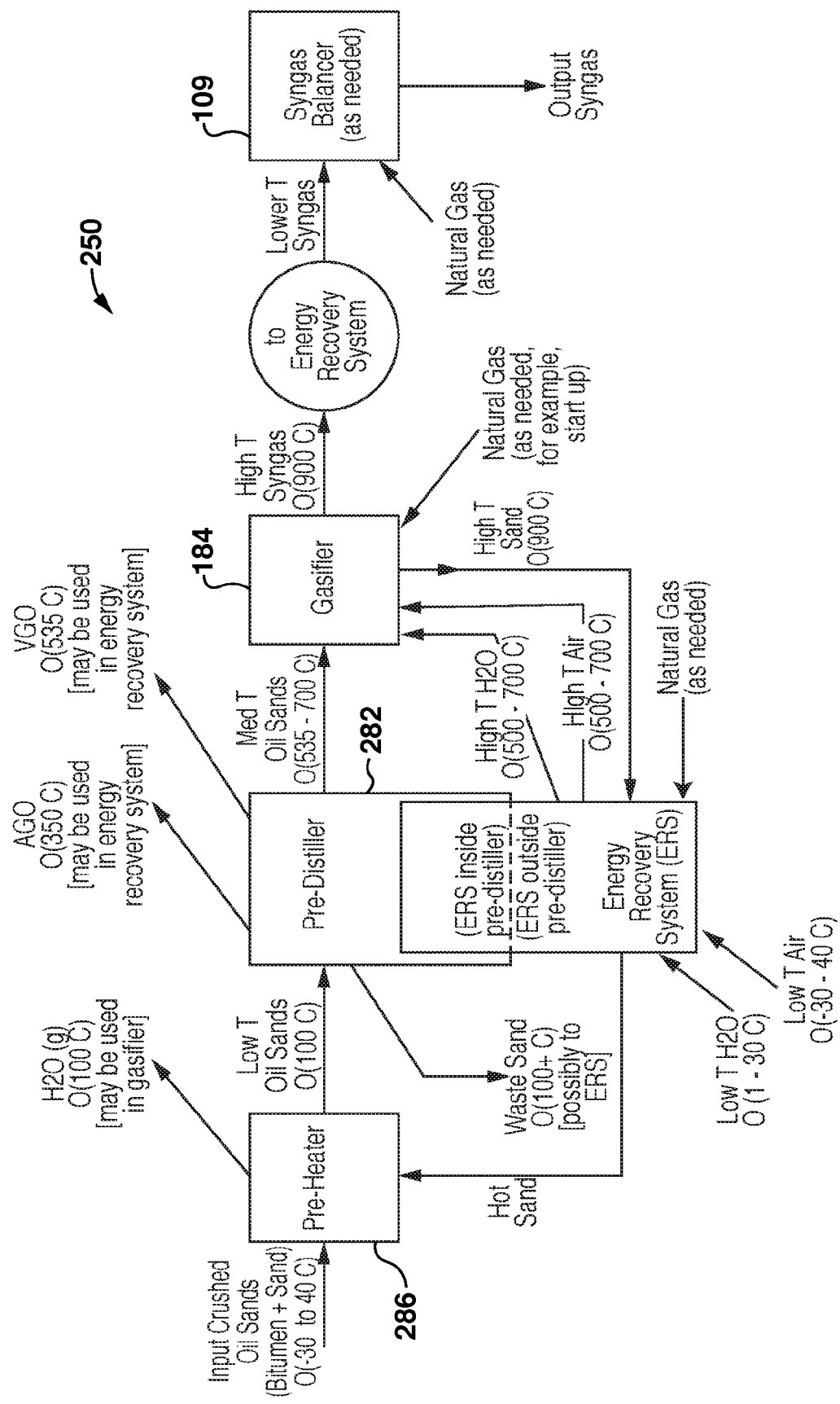
FIG. 6 is a block diagram illustrating another alternative embodiment of a method of the invention.
Figure 7:
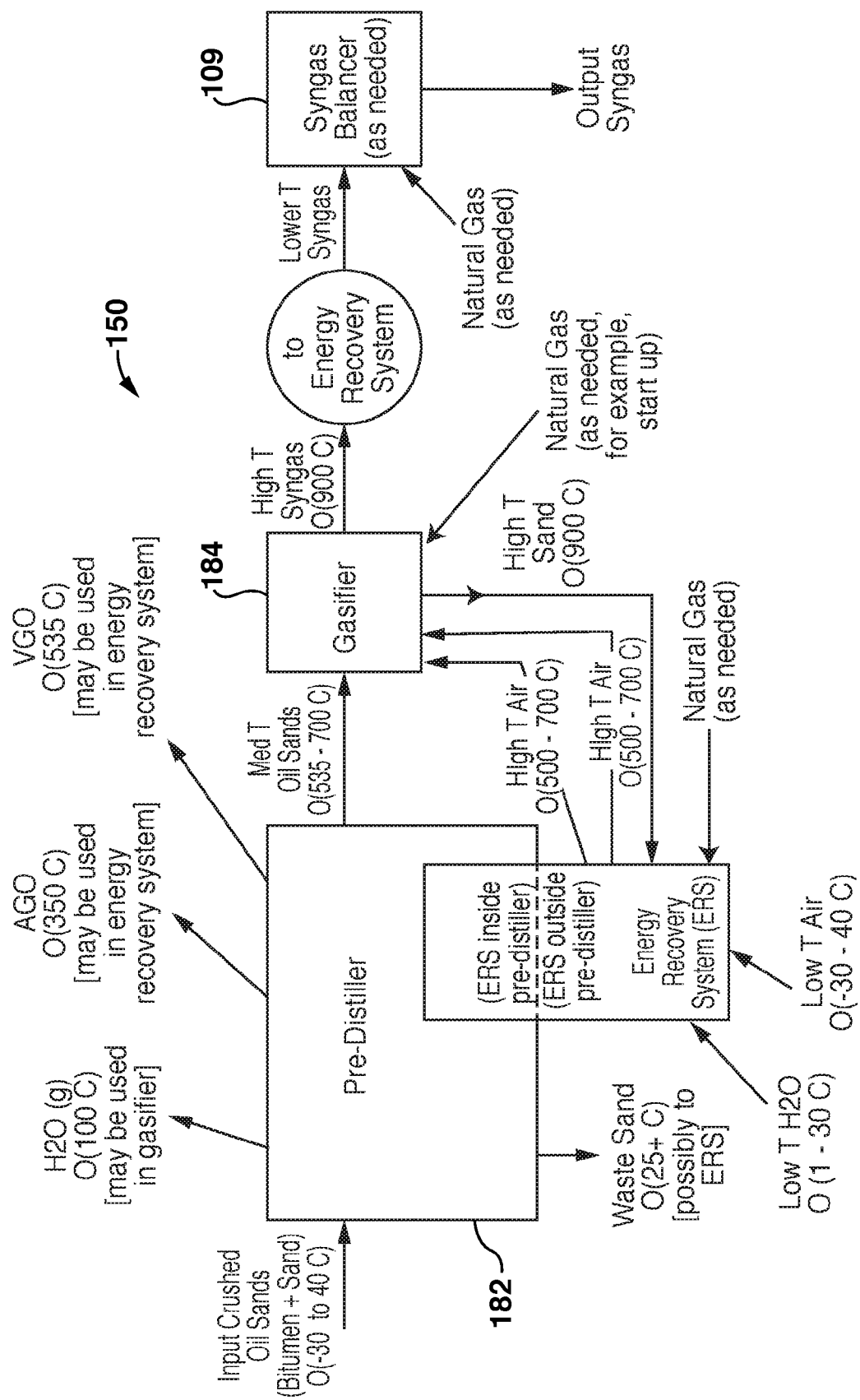
FIG. 7 is a block diagram illustrating another alternative embodiment of a method of the invention.

The method 150 of the invention is also schematically illustrated in FIG. 6, and the method 250 of the invention is also schematically illustrated in FIG. 7. As can be seen in FIGS. 6 and 7, each of these methods preferably includes utilizing the energy recovery system (also referred to in FIGS. 6 and 7 as "ERS") in which heat energy is at least partially recovered, as described above.

Among the benefits and advantages of the processes of the invention are the following.

(a) Overall water use is significantly reduced, resulting in the elimination of large tailings ponds.
(b) Carbon dioxide emissions to the atmosphere are significantly reduced.
(c) Maintenance costs incurred due to abrasion by the sand are reduced, because most of the processing is done in the vicinity of the mine.
(d) With sand recovery from processing occurring relatively close to the mine, the sand can be transported to the mine as landfill, facilitating reclamation at the mine.
(e) High-value products are not needed for use as diluents, for dilbit transport.

(f) Energy consumption during processing is reduced.

(g) The long-distance transportation of dilbit is eliminated.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

We claim:

1. A method of processing raw oil sands material comprising bitumen, the method comprising:
   (a) subjecting an oil sands material comprising the raw oil sands material to a predistillation process comprising:
      (i) heating the oil sands material to between approximately 350° C. and approximately 400° C., to produce atmospheric gas oil from the bitumen, and intermediate dried oil sands material;
      (ii) heating the intermediate dried oil sands material to between approximately 535° C. and at least approximately 600° C., to produce vacuum gas oil and coked oil sands material comprising carbon-heavy hydrocarbons and sand;
   (b) heating the coked oil sands material to approximately 900° C., to produce a dry barren hot oil sands material and syngas comprising hydrogen and carbon monoxide gases; and
   (c) transferring heat energy from at least a portion of the barren hot oil sands material to at least one of the oil sands material and the intermediate dried oil sands material.

2. A method according to claim 1 additionally comprising:
   (d) refining the atmospheric gas oil to provide at least one of liquefied petroleum gas and gasoline; and
   (e) refining the vacuum gas oil to provide at least one of jet fuel, diesel fuel, and gas oil.

3. A method according to claim 1 in which the syngas is further subjected to at least one gas-to-liquid process to provide at least one of gasoline, diesel fuel, naphtha, and petrochemical feedstock.

4. A method of processing raw oil sands material comprising free water and bitumen produced from a mine, comprising:
   (a) preheating a preheat oil sands material comprising the raw oil sands material to between approximately 100° C. and approximately 150° C. to convert the free water to steam, to release the free water from the raw oil sands material and to form a dried oil sands material from the preheat oil sands material;
   (b) in a first predistillation step, heating the dried oil sands material to between approximately 350° C. and approximately 400° C. to partially vaporize the bitumen, to provide atmospheric gas oil from the bitumen, and intermediate dried oil sands material;
   (c) in a second predistillation step, heating the intermediate dried oil sands material to between approximately 535° C. and at least approximately 600° C. to further at least partially vaporize the bitumen, to provide vacuum gas oil, and coked oil sands material comprising carbon-heavy hydrocarbons and sand;
   (d) in a gasifier, heating the coked oil sands material to approximately 900° C. for gasification thereof, to provide syngas comprising hydrogen and carbon monoxide gases retaining syngas heat energy therein, and a dry barren hot oil sands material retaining sand heat energy therein; and
   (e) transferring heat energy from at least a portion of the barren hot oil sands material to at least one of the preheat oil sands material and the dried oil sands material and the intermediate dried oil sands material.

5. A method according to claim 4 in which the steam is added to the coked oil sands material during the gasification thereof, to provide at least a portion of the hydrogen gas in the syngas.

6. A method according to claim 4 in which at least a part of the sand heat energy in the barren oil sands material is transferred to the dried oil sands material in the first predistillation step.

7. A method according to claim 4 in which at least a part of the sand heat energy in the barren oil sands material is transferred to the intermediate dried oil sands material in the second predistillation step.

8. A method according to claim 4 in which, prior to the gasification of the coked oil sands material, at least a portion of the syngas heat energy from previously produced syngas is transferred to the coked oil sands material, to heat the coked oil sands material to between approximately 650° C. and approximately 750° C.

9. A method according to claim 4 additionally comprising heating fresh water to between approximately 450° C. and approximately 500° C. to generate fresh water steam, and injecting the fresh water steam into the gasifier.

10. A method according to claim 4 additionally comprising heating air to between approximately 650° C. and approximately 750° C. to generate hot air, and injecting the hot air into the gasifier.

11. A method according to claim 4 additionally comprising:
   mixing the syngas with at least one additional gas to produce a balanced syngas comprising preselected gases in predetermined proportions.

12. A method according to claim 11 in which said at least one additional gas comprises a natural gas-derived syngas resulting from combustion of natural gas.

13. A method according to claim 11 in which the balanced syngas is subjected to a gas-to-liquids process to provide at least one of gasoline, diesel fuel, naphtha, and petrochemical feedstock.

14. A method according to claim 4 in which the raw oil sands are comminuted, prior to preheating, and screened such that only particles of the raw oil sands material below a predetermined particle size are included in the oil sand material.

15. A method according to claim 4 additionally comprising, before step (d), comminuting the coked oil sands material such that only the coked oil sands material below a preselected particle size is subjected to the gasification.

16. A method according to claim 4 in which at least a part of the barren hot oil sands material is transported to the mine for backfilling therein.

17. A method of processing raw oil sands material comprising free water and bitumen produced from a mine, comprising:
   (a) preheating a preheat oil sands material comprising the raw oil sands material to between approximately 100° C. and approximately 150° C. to convert the free water to steam, to release the free water from the raw oil sands material and to form a dried oil sands material from the preheat oil sands material;
   (b) in a predistillation process, heating the dried oil sands material to between approximately 535° C. and at least approximately 600° C. to at least partially vaporize the bitumen, to provide atmospheric gas oil and vacuum gas oil from the bitumen, and to provide coked oil sands material comprising carbon-heavy hydrocarbons and sand;

(c) in a gasifier, heating the coked oil sands material to approximately 900° C. for gasification thereof, to provide syngas comprising hydrogen and carbon monoxide gases retaining syngas heat energy therein, and a dry barren hot oil sands material retaining sand heat energy therein; and (d) transferring heat energy from at least a portion of the barren hot oil sands material to at least one of the preheat oil sands material and the dried oil sands material.

18. A method according to claim 17 in which the steam is added to the coked oil sands material during the gasification thereof, to provide at least a portion of the hydrogen gas in the syngas.

19. A method according to claim 17 in which at least a part of the sand heat energy in the barren oil sands material is transferred to the dried oil sands material in the predistillation process.

20. A method according to claim 17 in which, prior to the gasification of the coked oil sands material, at least a portion of the syngas heat energy from previously produced syngas is transferred to the coked oil sands material, to heat the coked oil sands material to between approximately 650° C. and approximately 750° C.

21. A method according to claim 17 additionally comprising, before step (c), comminuting the coked oil sands material such that only the coked oil sands material below a preselected particle size is subjected to the gasification.

22. A method according to claim 17 in which at least a part of the barren hot oil sands material is transported to the mine for backfilling therein.

23. A method of processing raw oil sands material comprising bitumen, the method comprising:

(a) in a predistillation process, heating the raw oil sands material to between approximately 535° C. and at least approximately 600° C. to at least partially vaporize the bitumen, to provide atmospheric gas oil and vacuum gas oil from the bitumen, and to provide coked oil sands material comprising carbon-heavy hydrocarbons and sand;

(b) heating the coked oil sands material to approximately 900° C., to produce a dry barren hot oil sands material and syngas comprising hydrogen and carbon monoxide gases; and (c) transferring heat energy from at least a portion of the barren hot oil sands material to the raw oil sands material.

\* \* \* \* \*